Patented May 17, 1932

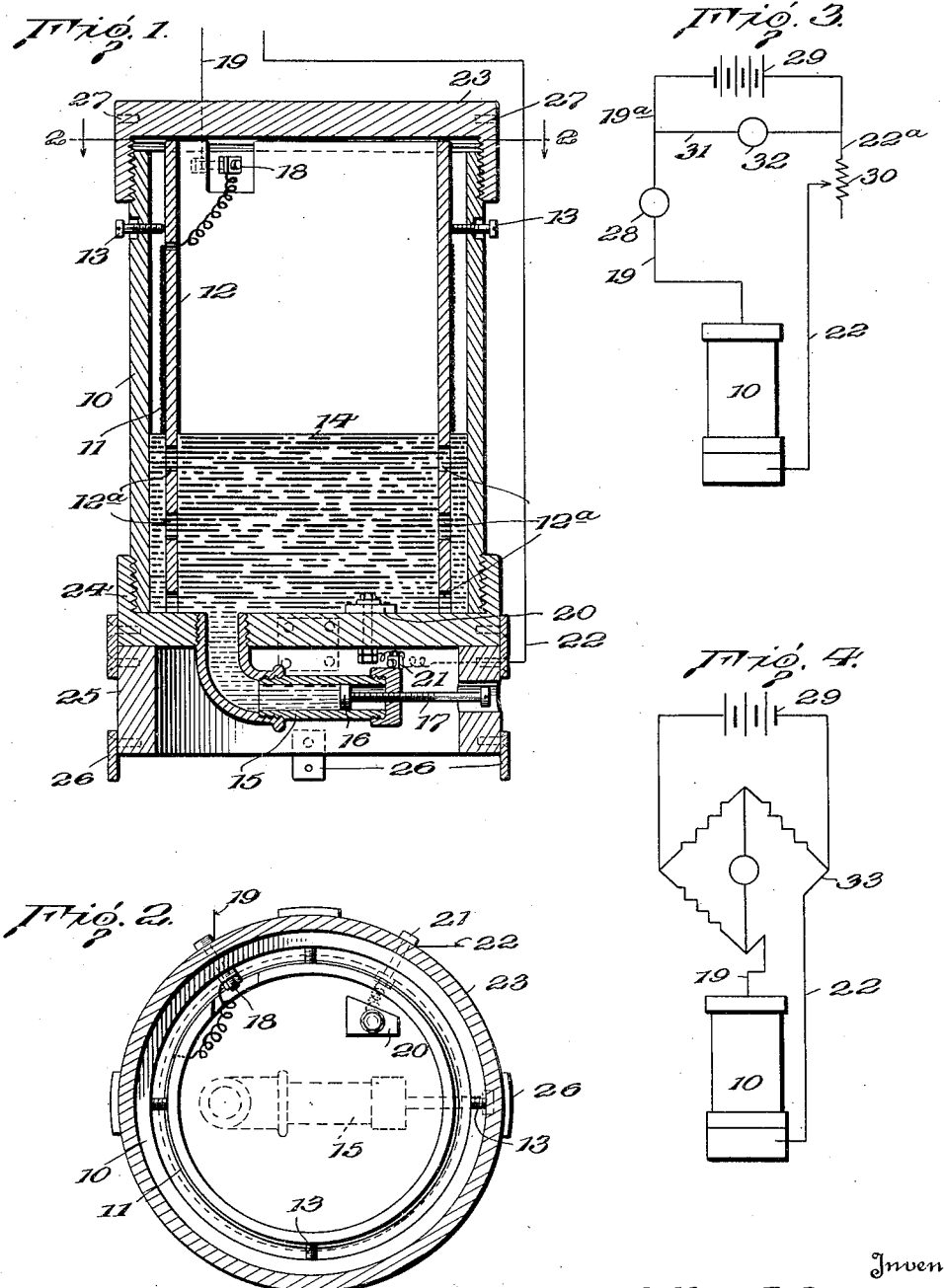

1,859,222

UNITED STATES PATENT OFFICE

WALTER F. ROGERS, OF HOUSTON, TEXAS, ASSIGNOR TO GULF PRODUCTION COMPANY, OF HOUSTON, TEXAS, A CORPORATION OF TEXAS

APPARATUS FOR DETERMINING THE VERTICAL DEVIATION OF BORE HOLES

Application filed October 28, 1929. Serial No. 403,040.

This invention relates to improvements in apparatus for determining vertical deviations of bore holes, and particularly for determining vertical variations in oil and gas wells during the drilling thereof.

Frequently it becomes advisable for drilling operators, and especially in the drilling of oil and gas wells, to make surveys of the well to determine deviations of the bore hole from the vertical or a true vertical line or position, and the primary object of the present invention is to provide an apparatus that will indicate the extent of the deviation of a bore hole through changes in the current flow through the present apparatus, or changes in the internal electrical resistance of such apparatus, either of which changes may be calibrated in terms of change in the vertical position of the instrument and which must correspond to the change in the vertical position of the bore hole.

More specifically, the invention contemplates a device comprising a casing containing a series of electrical resistance elements which, together with means for shunting one or more of said elements, constitute portions of an electrical circuit that also includes means at the surface of the earth for indicating changes in the flow of current through said resistance elements. This device is adapted to be supported in parallel position relatively to the walls of the bore hole, so that as the hole deviates, the position of the device will be correspondingly affected, with the result that one or more of the electrical resistance units contained therein will be shunted from the circuit, the elimination of their resistance being registered by suitable indicating means observable by the driller or operator.

With these and other objects in view, the invention consists in certain novel details of construction and combinations and arrangements of parts, all as will be hereinafter more fully described and the particular features thereof pointed out in the appended claims.

In the accompanying drawings:

Figure 1 is a longitudinal sectional view of the device made in accordance with the preferred embodiment of the invention;

Figure 2 is a transverse sectional view on the line 2—2 of Figure 1;

Figure 3 is a diagrammatical illustration of one method of utilizing the present device; and Figure 4 is a similar view of a modified arrangement for utilizing the present apparatus.

In the preferred embodiment of the invention as illustrated in Figures 1 and 2, there is a casing 10 adapted to house a series of electrical resistance elements 11 and means for shunting, successively, one or more of said elements so as to alter the electrical current flowing through said resistance elements. While such resistance elements might take various forms or be carried directly on the wall of casing 10, it is preferred that such elements consist of a plurality of convolutions or turns of relatively high resistance wire wound on a tubular member 12, arranged substantially concentric with the interior wall of the casing. This arrangement is advantageous for the following reason: In use, casing 10 is adapted to be supported in the bore hole by the usual bailer, tubing string, drill stem, or the like, and so fitted with respect to the well bore or its lining as to be held to the true position of the well as distinguished from being loosely suspended in the well in such fashion as to be capable of swinging or swaying. In other words, casing 10 is adapted to be held in axial alinement with the adjacent portion of the bore hole and by having the turns of resistance wire carried on tubular member 12, the wire turns can be accurately centered with respect to the periphery of the casing by means of adjusting screws 13 projecting through the casing into contact with one end of said member 12.

As illustrated in Figure 1, these turns or convolutions of resistance wire 11 are located intermediate the ends of the casing, although it is only necessary that they be spaced from the bottom of said casing. Occupying this space between the lowermost turn of resistance wire and the bottom of the casing, there are means for successively shunting one or more of the turns of resistance wire, it being understood that these resistance elements constitute part of an electrical circuit, as will hereinafter be described. These resistance shunting means preferably consist of a body of mercury 14, and in order that the level of the mercury may be maintained at all times at a point where it will contact with wire 11, there is provided below the casing a tube or well 15 communicating with the interior of said casing, so that the body of mercury extends down into the tube. Within said tube there is a piston 16, adapted to be manipulated by a screw 17, whereby the level of the mercury may be raised or lowered by altering the position of piston 16 in said tube 15. It should be mentioned that tubular member 12 is provided with a plurality of apertures 12a for passage of the mercury therethrough. The uppermost turn or convolution of resistance wire 11 is attached to the inner end of a binding post 18 and to the outer end of said binding post, there is attached a lead wire 19, adapted to extend to the surface of the ground. At the bottom of the casing, there is a copper contact plate 20 which is connected by a binding post 21 to a lead wire 22 that also is adapted to extend to the surface, this wire and wire 19 being connected to certain electrical devices at the surface, for purposes which will be hereinafter described.

While casing 10 may be of any desirable construction, it is preferably formed with upper and lower cap pieces 23, 24, the entire casing being of any fiber, rubber, or metal that will be unaffected by the mercury. To the lower cap 24, there is attached a ring member 25, for the protection of the mercury well formed by tube 15, and, if desired, there may be attached to said ring member plates 26, formed with screw holes whereby two or more of these units may be connected together, if it should be desired to use them in multiple at any time. For this reason, the upper cap piece 24 is tapped with screw holes, as indicated at 27.

Referring to Figure 3, illustrating one method of using the present device, the latter is indicated in outline at 10 and, it being assumed that the device is positioned in the bore hole, conductor 19 is connected to an ammeter 28 of suitable range, which, in turn, is connected by wire 19a to one terminal of a storage battery 29. Conductor wire 22 leads to a variable resistance unit 30, which, in turn, is connected by wire 22a to the other terminal of battery 29, while wires 19a, 22a, are connected together by a wire 31, in which line there is interposed a volt meter 32. With this arrangement, it is apparent that as the casing 10 is tilted from the vertical position, the mercury, always tending to assume a horizontal position, will move across and cut, in section, one or more of the turns of the resistance wire 11, the number of turns being cut out depending upon the vertical deviations of the bore hole and casing 10. If a constant voltage is impressed through the unit and the surface lead wires, a constant current will flow, but if the well unit is tilted, as just mentioned, a portion of the resistance wire will be cut out, and this change in the total electrical resistance in the circuit will effect a change in the current flow, and, as before mentioned, this change in current flow may be easily calibrated into terms of vertical deviation. Another method of usage is shown in Figure 4, wherein wires 19 and 22 are connected to a Wheatstone bridge 33, which is in circuit with storage battery 29. With this arrangement, the well unit is the equivalent of the unknown resistance of a Wheatstone bridge hook-up, and the change in resistance of the unit, as determined by the Wheatstone bridge, may be calibrated in terms of vertical deviation.

What is claimed is:

1. In a device for determining the vertical deviation of a bore hole, a casing member of such size as to be receivable and axially movable in the bore hole and including means associated therewith for snugly engaging the wall of the bore hole and accurately coaxially disposing said casing member with respect to the portion of the wall of the bore to which it is adjacent, a helical winding of electrical resistance wire coaxially disposed within said casing, and a body of highly conductive fluid disposed in the bottom of said casing for successively shunting turns of said winding in accordance with progressive inclination of said casing with respect to the vertical, thereby providing an indication of vertical deviation in terms of diminished resistance in a circuit including said winding and conductive body of fluid.

2. In a device for determining the vertical deviation of a bore hole, a casing member of such size as to be receivable and axially movable in the bore hole, and including means associated therewith for snugly engaging the wall of the bore hole and accurately coaxially disposing said casing member with respect to the portion of the wall of the bore to which it is adjacent, a tubular member of electrically non-conductive material coaxially supported within said casing, a helical winding of electrical resistance wire upon said tubular member, means for adjusting said tubular member to accurately dispose said winding in coaxial relationship with respect to said casing, and a body of highly conductive fluid disposed in the bottom of said casing for successively shunting turns of said winding in accordance with progressive inclination of said casing with respect to the vertical, thereby providing an indication of vertical deviation in terms of diminished resistance in a circuit including said winding and conductive body of fluid.

3. In a device for determining the vertical deviation of a bore hole, a casing member of such size and form as to accurately assume, when disposed therein, a coaxial position with respect to the adjacent wall portion of a bore hole, a tubular member of electrically non-conductive material coaxially supported within said casing, a helical winding of electrical resistance wire upon said tubular member, means for adjusting said tubular member to accurately dispose said winding in coaxial relationship with respect to said casing, a body of highly conductive fluid disposed in the bottom of said casing for successively shunting turns of said winding in accordance with progressive inclination of said casing with respect to the vertical, and means for adjusting said body of fluid so that, when the casing is vertically disposed, the surface of said fluid body will contact with the first turn only of said winding.

4. In a device for determining the vertical deviation of a bore hole, a cylindrical casing, a bottom thereon, a cap threaded thereon, said bottom and cap having such diameter with respect to the size of the bore hole to be tested as to cause said casing to assume an accurately coaxial position with respect to the portion of the bore wall to which it is adjacent, a tubular member of electrically non-conductive material coaxially supported upon said bottom within said casing, the lower portion of said tubular member having therethrough a plurality of ports, the upper portion of said tubular member having wound thereon an electrical resistance element comprising a plurality of turns of resistance wire, and a fluid contactor element in the lower portion of said casing mobile through said ports for successively shunting turns of said winding in accordance with progressive inclination of said casing with respect to the vertical, thereby providing an indication of vertical deviation in terms of diminished resistance in a circuit including said winding and fluid contactor.

WALTER F. ROGERS.